United States Patent [19]
Timme, Jr.

[11] 4,438,953
[45] Mar. 27, 1984

[54] TOOL JOINT BENCH MARK

[75] Inventor: Albert C. Timme, Jr., Houston, Tex.

[73] Assignee: Hughes Tool Company, Houston, Tex.

[21] Appl. No.: 238,720

[22] Filed: Feb. 27, 1981

[51] Int. Cl.³ .............................................. F16L 35/00
[52] U.S. Cl. ...................................... 285/93; 285/333; 72/367
[58] Field of Search .................. 285/93, 333, 334, 355, 285/390; 72/367

[56] References Cited

U.S. PATENT DOCUMENTS 1,942,518  1/1934  Protin ................................. 285/93 X
3,822,902  7/1974  Maurer ............................. 285/333 X
4,317,585  3/1982  Boile ..................................... 285/93

FOREIGN PATENT DOCUMENTS 1017763  1/1966  United Kingdom ................. 285/333

OTHER PUBLICATIONS

As 207—Hughes Tool Company—Apr. 1, 1976.

Primary Examiner—Dave W. Arola
Attorney, Agent, or Firm—Robert A. Felsman; James E. Bradley

[57] ABSTRACT

Drill pipe for an oil and gas well drill string has a better bench mark system for determining when the tool joints of the drill pipe are no longer satisfactory for sealing. The bench mark is an edge formed in the tool joint in the space between the threads and the make-up shoulder of the tool joint. The edge extends around the circumference of the tool joint for serving as a reference line to measure the distance from the reference line to the make-up shoulder. On the pin type tool joint, the bench mark edge is formed by forming a cylindrical surface in the tapered surface normally located between the threads and make-up shoulder. In the box type tool joint, the bench mark edge is formed by forming a cylindrical surface in the normal tapered surface to create a bench mark shoulder inward from the make-up shoulder.

5 Claims, 5 Drawing Figures

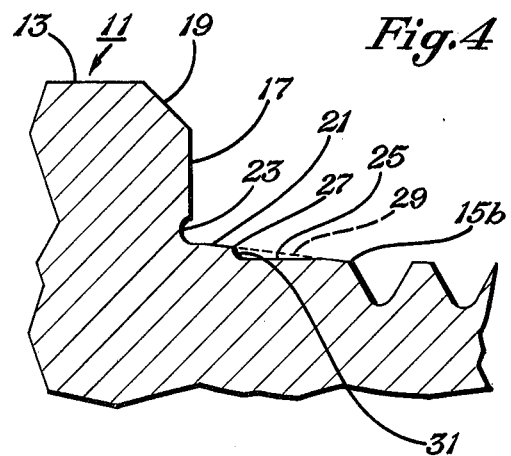
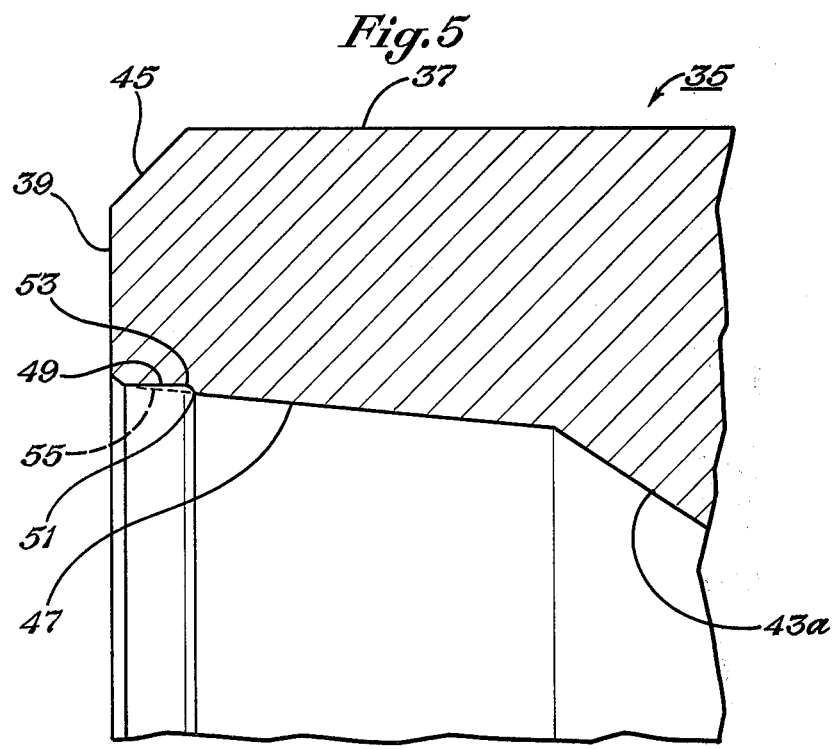

TOOL JOINT BENCH MARK

BACKGROUND OF THE INVENTION

This invention relates in general to oil and gas well drill pipe, and in particular to a means for bench marking the tool joints of the drill pipe.

A string of oil and gas well drill pipe is made up of sections of pipe, each about 30 foot long. Each section has an externally threaded pin on one end and an internally threaded box on the other end, these ends being known as "tool joints". Each set of threads is tapered and has a point where the pitch diameter is a specific amount, this point being known as the gage point. A make-up shoulder is spaced a selected distance from the gage point of the threads on the pin. Another make-up shoulder is located at the outer end of the box. When fully made-up, these make-up shoulders contact each other under a selected amount of compression to provide a fluid tight seal. To achieve the proper amount of compression, the distance from the pin make-up shoulder to the gage point of the pin threads, and the distance from the box make-up shoulder to the gage point of the box threads, must be carefully controlled.

During use, the make-up shoulders may gall and score. To achieve a smooth surface again, the shoulders are redressed. It is important that the total material removed from the two mating shoulders be no more than 1/16 inch from original, or no more than 1/32 inch from any shoulder. If the material removal totals more than 1/16 inch from mating shoulders, inadequate compression may occur during make-up. Fatigue failures and washouts may result.

The American Petroleum Institute recommends to manufacturers the use of an indentured circle and tangent bar or line stamped into the tool joint pin and the box counterbore. The bar would be impressed into the metal exactly ⅛ inch from, and parallel to, the make-up shoulder. This method has two shortcomings. First, it must be hand-applied. Therefore, it is time consuming and potentially unreliable. Also, this method marks only one point of the pin or box.

SUMMARY OF THE INVENTION

The bench mark of this invention consists of a bench mark shoulder formed around the pin outer diameter ⅛ inch from the make-up shoulder. Similarly, the box counterbore has a step or bench mark shoulder formed around it ⅛ inch from the make-up shoulder. The bench mark shoulder is used as a reference line to determine the distance from the make-up shoulder to the reference line, after the make-up shoulder has been redressed. Because the bench mark is a continuous step around the circumference of the pin outer diameter, and a continuous counterbore around the circumference of the box inner diameter, it provides the extra advantage of serving as an indicator of uneven machining of the tool joint shoulder. Preferably, the mark is placed on the tool joint during the operation in which threads are machined onto the tool joint, which is a numerically-controlled, automated process. This reduces the possibility of human error, and saves a substantial amount of time and manpower.

BRIEF DESCRIPTION OF THE DRAWINGS

FIG. 4 is an enlarged partial sectional view of the tool joint pin of FIG. 2.

FIG. 5 is an enlarged partial sectional view of the tool joint box of FIG. 3.

DESCRIPTION OF THE PREFERRED EMBODIMENT

Figure 2:
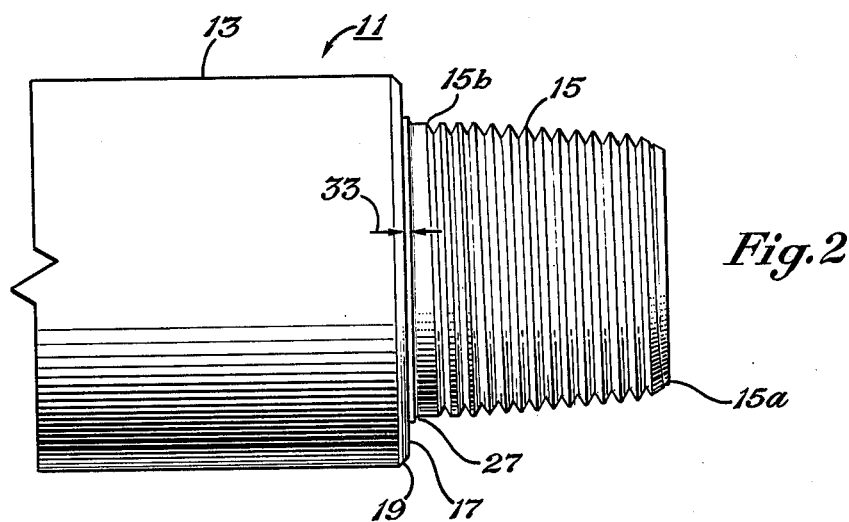
FIG. 2 is a side view of a tool joint pin having a bench mark in accordance with this invention.

Referring to FIG. 2, the pin or tool joint 11 for a drill pipe member is shown. Tool joint 11 has a cylindrical surface 13 containing an inner bore (not shown). A set of external threads 15 are formed on the end of the cylindrical surface 13. Threads 15 have an outer end 15a located at the extreme end of tool joint 11. Threads 15 extend inwardly on the tool joint 11 for a selected distance, terminating at an inner end 15b. Threads 15 are tapered, resulting in a lesser outer diameter at the outer end 15a than at the inner end 15b.

A make-up shoulder 17 is formed in tool joint 11 a selected distance from the gage point of threads 15 and inward from the inner end 15b. Make-up shoulder 17 is an annular surface located in a plane perpendicular to the axis of tool joint 11. Make-up shoulder 17 faces outwardly and has a bevel 19 formed at its intersection with the cylindrical surface 13.

Prior to the machining of the threads 15, the portion of the tool joint from make-up shoulder 17 to the outer end was a frusto-conical surface, with a larger base or outer diameter at the make-up shoulder 17 than at the outer end. Referring to FIG. 4, after the machining of the threads 15, a portion 21 of a frusto-conical surface exists between make-up shoulder 17 and threads inner end 15b. Note that an annular groove or recess 23 is formed at the intersection of the frusto-conical portion 21 and the make-up shoulder 17, to avoid a sharp intersection and to provide a make-up shoulder that can be redressed.

A cylindrical surface 25 is machined into the frusto-conical portion 21. This results in a step, shoulder, or bench mark 27 on the inner side of cylindrical surface 25 for serving as a bench mark. The bench mark 27 faces outwardly and defines an edge contained in a plane that is parallel with the make-up shoulder 17. The outer diameter of the cylindrical surface 25 is selected so that its outer side will intersect the normal frusto-conical surface 21 inward from the inner end 15b of the threads. This intersection, and the portion of the surface 21 that is removed, is indicated by the dotted lines 29 in FIG. 4. A small fillet or radius 31 is formed at the intersection of cylindrical surface 25 and bench mark 27 to reduce stress concentration.

Bench mark 27 is formed on the tool joint 11 during the machining of the threads of the tool joint. As indicated by the arrows 33 in FIG. 2, the bench mark 27 is used to measure the distance from the make-up shoulder 17 to the bench mark, which originally is preferably ⅛ inch. Should the make-up shoulder 17 be redressed, this reference distance will increase, and will serve as an indication of whether or not a sufficient amount of compression will be able to be achieved. If the increase in the reference distance exceeds a selected standard amount, such as 1/32 inch, then the tool joint 11 will not be suitable for further use.

Figure 3:
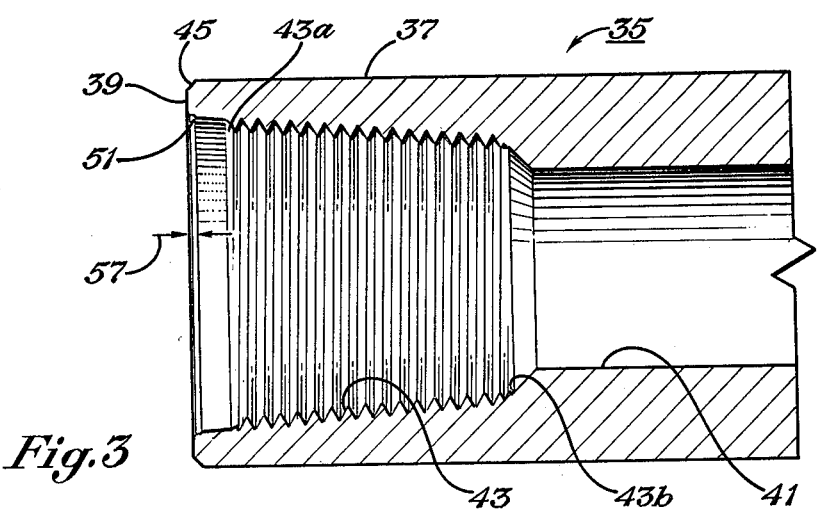
FIG. 3 is a vertical sectional view of a tool joint box having a bench mark in accordance with this invention.

Referring to FIG. 3, a box tool joint 35 is shown. Tool joint 35 has a cylindrical outer surface 37. On its extreme outer end, a make-up shoulder 39 is formed. Make-up shoulder 39 is an annular surface located in a plane that is perpendicular to the axis of tool joint 35. Tool joint 35 has an inner bore 41. A set of internal threads 43 are machined into the bore 41. Threads 43 have an outer end 43a that is located a selected distance from make-up shoulder 39, and an inner end 43b that is located a selected distance further inward. Threads 43 are tapered, or formed in a frusto-conical surface, with the inner end 43b being of a lesser diameter than the outer end 43a. A bevel 45 is formed at the intersection of the make-up shoulder 39 with the cylindrical surface 37.

Referring to FIG. 5, a portion 47 of a frusto-conical surface exists between the make-up shoulder 39 and threads 43. A cylindrical surface or counterbore 49 is formed in the frusto-conical surface 47 near the make-up shoulder 39. This produces a shoulder or bench mark 51 on the inner side of cylindrical surface 49 preferably ⅛ inch from the make-up shoulder 39. Bench mark 51 faces outwardly, and has a small fillet or radius 53 formed at the intersection of the bench mark 51 with the cylindrical surface 49 for reducing stress concentration. Bench mark 51 defines an edge contained within a plane parallel with the plane containing make-up shoulder 39. The diameter of cylindrical surface 49 is selected so that its outer side would intersect the normal tapered surface 47 inward from make-up shoulder 39. A bevel is located at this point of intersection. Dotted lines 55 indicate the metal that has been removed from the frusto-conical surface 47 by the formation of cylindrical surface 49.

As indicated by the arrows 57 in FIG. 3, bench mark 51 will indicate the distance from make-up shoulder 39 to bench mark 51. If this distance becomes too small, due to redressing of the make-up shoulder 39, then this will indicate that the tool joint 35 must be discarded. In operation, tool joint 11 is made up into a box tool joint 35. Make-up shoulder 17 will be in compression with make-up shoulder 39 when the threads 15 and 43 are fully made up. The bench marks 27 and 51 will not contact each other since frusto-conical surface 21 is smaller in diametrical dimension than frusto-conical surface 47.

Figure 1:
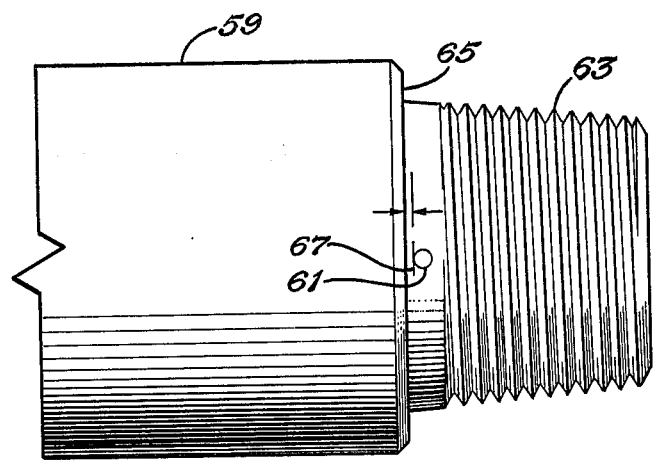
FIG. 1 is a side view of a tool joint pin having a prior art bench mark.

The tool joint 59 in FIG. 1 is identical to the pin tool joint 11 of FIG. 2, except that it has been bench marked with a prior art technique. This prior art technique involves stamping an indentured circle 61 into the space between the threads 63 and make-up shoulder 65. The symbol also includes a tangent line 67 located on the inner side of the circle 61.

The invention has significant advantages. Since the bench marks are continuous edges formed around the circumferences of the tool joint members, they will serve as indicators of uneven machining of the tool joint shoulder. Also, the marks may be incorporated into the tool joint during the threading operation, which is normally numerically controlled and automated. This saves a substantial amount of time, and reduces the possibility of human error.

While the invention has been shown in only two of its forms, it should be apparent to those skilled in the art that it is not so limited but is susceptible to various changes and modifications without departing from the spirit of the invention.

I claim:

1. An improved bench mark for a drill pipe member having tool joints on each end of the type having threads spaced from the make-up shoulder, comprising: an edge formed in each of the tool joints in the space between the threads and make-up shoulder, the edge extending continuously around the space between the threads and make-up shoulder; the edges being located the same distance from their respective make-up shoulders.

2. An improved bench mark for a drill pipe member having tool joints on each end of the type having threads spaced from a make-up shoulder, comprising: a bench mark shoulder formed in each of the tool joints in the space between the threads and the make-up shoulder, the bench mark shoulder extending circumferentially and having an edge located in a plane parallel with a plane containing the make-up shoulder; the edge having a diameter that is less than the inner diameter of the make-up shoulder.

3. An improved bench mark for a drill pipe member having tool joints on each end of the type having an annular make-up shoulder facing outwardly, a set of tapered threads spaced from the make-up shoulder, and a frusto-conical surface located between the threads and make-up shoulder, comprising:
   a cylindrical surface formed in the frusto-conical surface of each tool joint, defining on an inner side an outwardly facing annular bench mark shoulder.

4. A method of bench marking a tool joint pin of the type having an annular make-up shoulder facing outwardly, a frusto-conical surface extending outwardly from the make-up shoulder, and a set of tapered threads extending outwardly from the frusto-conical surface, with the inner end of the threads spaced from the make-up shoulder, comprising:
   forming in the frusto-conical surface a cylindrical surface of selected width, defining an outwardly facing, annular bench mark shoulder on an inner side of the cylindrical surface;
   the diameter of the cylindrical surface being selected so as to cause the outer side of the cylindrical surface to intersect the frusto-conical surface inward from the inner end of the threads; and
   forming a radius at the junction of the bench mark shoulder and cylindrical surface.

5. A method of bench marking a drill pipe member having a tool joint box on one end of the type having an annular make-up shoulder, an internal frusto-conical bore extending inward from the box make-up shoulder, and internal tapered box threads extending inwardly from the frusto-conical bore, and on the other end a tool joint pin of the type having an annular pin make-up shoulder facing outwardly, a pin frusto-conical surface extending outwardly from the pin make-up shoulder, and a set of tapered pin threads extending outwardly from the pin frusto-conical surface, with the inner end of the pin threads spaced from the pin make-up shoulder, the method comprising:
   counterboring in the frusto-conical bore a box cylindrical surface defining an outwardly facing, annular bench mark shoulder on an inner side of the box cylindrical surface; and
   forming in the pin frusto-conical surface a pin cylindrical surface of selected width, defining an outwardly facing annular bench mark shoulder on an inner side of the pin cylindrical surface;
   the diameter of the pin cylindrical surface being selected so as to cause the outer side of the pin cylindrical surface to intersect the pin frusto-conical surface inward from the inner end of the pin threads.

* * * * *